United States Patent Office 2,905,639
Patented Sept. 22, 1959

2,905,639

LUBRICATING OIL COMPOSITIONS

Hans Krzikalla, Heidelberg, Hans Engel, Heidelberg-Handschuhsheim, and Willy Wolf and Heinz Pohlemann, Ludwigshafen (Rhine), Germany, assignors to Badische Anilin- & Soda-Fabrik Aktiengesellschaft, Ludwigshafen (Rhine), Germany No Drawing. Application November 23, 1954
Serial No. 470,806

Claims priority, application Germany November 26, 1953

5 Claims. (Cl. 252—32.7)

This invention relates to additives for lubricants.

We have found that oil-soluble derivatives of 4 mols or less of a 2.5-dimercapto-1.3.4-thiadiazole corresponding to the formula

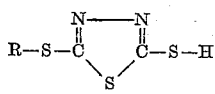

and one mol of phosphorus pentasulfide can be used as additives to lubricants, R in the formula representing a hydrocarbon radical with at least 6 carbon atoms.

R in the above formula represents normal or branched aliphatic radicals with at least 6 carbon atoms, as for example hexyl, heptyl, octyl, decyl, octodecyl or octodecenyl, or cycloaliphatic radicals, as for example cyclohexyl, methylcyclohexyl or decahydronaphthyl or abietinyl; R can also represent aromatic radicals, as for example phenyl, butylphenyl, or heptylphenyl. The fundamental substance, 2.5-dimercapto-1.3.4-thiadiazole, is preferably prepared by the reaction of crude hydrazine solutions with carbon disulfide, for example according to the application Serial No. 413,729, filed March 2, 1954, now abandoned, by Hans Krzikalla and Heinz Pohlemann.

The production of the dimercapto thiadiazole derivatives according to the invention (which takes place by conventional methods and does not form the subject of this invention) may be carried out for example by treating 2.5-dimercapto-1.3.4-thiadiazole, for example with alkylating agents which contain 6 or more carbon atoms, as for example with halogen hydrocarbons. The treatment is carried out in neutral or preferably alkaline medium, for example in aqueous solution or while using organic solvents at temperatures between about $-10°$ and $200°$ C. In some cases the use of increased pressure may be advantageous. Monoalkyl or monoacyl derivatives which will contain a free mercapto group can be converted by oxidation or by reaction with bifunctional organic compounds and a further molecule of monoalkyl or monoacyl derivative of 2.5-dimercapto-1.3.4-thiadiazole, into disulfides or thioethers. The oil-soluble dimercapto-thiadiazole derivatives improve the film strength of lubricating oils and thus their lubricating power under high pressure loads.

The derivatives herein contemplated contain free sulfhydryl groups and can have further lubricating oil improving properties imparted thereto by modifying these groups. For example these reactive groups can be reacted with phosphorus sulfides, in particular phosphorus pentasulfide. In general only 1 mol of phosphorus pentasulfide, or less, is used for each 4 mols of derivatives of 2.5-dimercapto-1.3.4-thiadiazole having free sulfhydryl groups in order to prevent the formation of resinous by-products. The acid substances thus obtained have inhibitor properties and are effective when added in very small amounts, as for example about 0.1 to 1% of the oil to which they are added.

The reaction which takes place when a 2.5-dimercapto-1.3.4-thiadiazole derivative containing a free sulfhydryl group is reacted with phosphorus pentasulfide, presumably proceeds as follows:

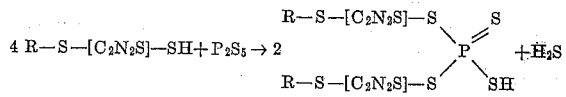

In such compounds the dimercapto thiadiazole radical is connected to a thiophosphoric acid radical.

These compounds containing a thiophosphoric acid radical are multifunctional lubricating oil improvers which display their valuable properties especially in motor oils used for the lubrication of internal combustion engines. They are useful both in gasoline engines and diesel engines operated under heavy service conditions as a means for keeping the engine clean. Besides preventing deposits of carbonaceous matter and sludge, the compounds also form protective layers on the surface of the bearings so that undue loss of weight is avoided, and prevent the deterioration of the motor oils. Although the substituents contained in the molecule of the additives, such as thiophosphoric acid radicals and metals modify their properties in a certain degree, the fundamental oil improving property is inherent in that part of the molecule which is common to all the new additives, i.e. the dimercapto thiadiazole radical to which oil-solubility is imparted by the radical R as defined above.

Metals, preferably polyvalent metals, such as barium, strontium, calcium, magnesium, zinc, aluminium, and tin, can also be introduced into the dimercapto-thiadiazole and phosphorus sulfide reaction products, and in this way the compounds are still further improved in their stability and lubricating oil improving action. The introduction of the metals can be effected directly by the action of basic-reacting compounds, as for example oxides, hydroxides or alcoholates of the said metals or by way of the alkali metal compounds by double decomposition with salts of the metals to be introduced. Usually it is advantageous to introduce a plurality of metals, preferably zinc or tin and one or more of the metals barium, strontium, calcium, magnesium.

Especially good products are obtained when in the introduction of the metals by means of basic metal compounds, as for example alcoholates, oxides or hydroxides, operation is in the presence of alcohols, as for example methanol or ethanol, which may contain water, at least towards the end of the treatment. By using sufficient amounts of the metal compounds there are then obtained alkaline-reacting products which behave especially well in the engine.

If metals are introduced into the above-described products only partially are reacted with phosphorus pentasulfide, there are obtained substances having a number of different effects, as for example detergent, inhibitor and high pressure lubricating action. They impart heavy duty quality to engine oils.

The new lubricant additives are added to the oils to be improved in proportions of from about 0.01 to 5 percent, usually from 0.1 to 3 percent. In practice it is advantageous first to prepare a concentrated solution of any of the additives in lubricating oil at the rate of from 70 to 15 percent of the additive and from 30 to 85 percent of oil; such concentrated solutions are readily soluble in the oils to be improved by combining them at a temperature of between $15°$ and $80°$ C. An outstanding advantage of the solutions is their marketable form which enables oil producers to compound the oils in a simple apparatus.

The new lubricant additives can be used together with other lubricant additions, as for example with pour point depressants, viscosity index improvers and froth-preventing agents. The new additives are compatible with other detergents and/or inhibitors and can be used in combination therewith. For example the products obtained by introduction of metals into dimercaptothiadiazole derivatives can be combined with salts of phosphorus pentasulfide reaction products of alcohols, alkylphenols, alkylphenol sulfides, alkylphenol sulfide esters, primary or secondary alkylamines or unsaturated hydrocarbons, such as polyisobutylene or pinene, or also with inhibitors of the type of tetramethyldiaminodiphenylmethane or with lecithin. On the other hand the phosphorus sulfide reaction products of the thiadiazole derivatives or their metal salts can be used together with metal compounds of alkylphenols, alkylphenol sulfides, alkylphenol sulfide esters or oil-soluble sulfonic acids as lubricating oil ameliorants. Metal-containing dimercaptothiadiazole derivatives which are not phosphorus sulfide reaction products can also be used together with phosphorus sulfide reaction products of dimercaptothiadiazole derivatives, which may also contain metal if desired.

The following examples will further illustrate this invention but the invention is not restricted to these examples. The parts are parts by weight.

*Example 1*

100 parts of 2-dodecylmercapto-5-mercapto-1.3.4-thiadiazole are mixed with 17 parts of phosphorus pentasulfide, heated to 130° C., mixed with 300 parts of engine lubricating oil and heated with 80 parts of Ba(OH)$_2$.8H$_2$O at 150° C. until the frothing subsides and then heated for a short time at 200° C. After filtration there is obtained a product which imparts heavy duty quality to engine oils in amounts of 0.5 to 2% together with about 1 to 2% of the zinc compound of isobutylphenol sulfide monoacetic acid ester.

Instead of the dodecyl derivative there may also be used the corresponding heptyl or octyl derivatives, and instead of barium hydroxide there may be used the equivalent amounts of calcium hydroxide, aluminium hydroxide or calcium alcoholate.

*Example 2*

100 parts of the initial material specified in Example 1 are mixed with 6 parts of phosphorus pentasulfide, heated to 200° C., filtered hot and treated for half an hour at about 80° C. with 3 parts of zinc oxide and 3 parts of methanol under reflux. After again filtering, the methanol is distilled off, the product mixed with 200 parts of engine oil, the solution heated to 130° C., 70 parts of Ba(OH)$_2$.8H$_2$O added in portions at the same temperature and the whole heated for a short time to 200° C. The product is filtered, 2 parts of calcium oxide, 2 parts of water and 2 parts of methanol are added and the whole heated for a quarter of an hour at 80° C. The methanol and water are then distilled off. If a sample of the product is heated with methanol and phenolphthalein is added, red coloration occurs. The product imparts heavy duty quality to engine oils.

We claim:

1. The process of improving mineral lubricating oils which comprises adding to a mineral lubricating oil from about 0.01 to about 5 percent of an oil-soluble compound selected from the group consisting of a 2.5-dimercapto-1.3.4-thiadiazole derivative corresponding to the formula

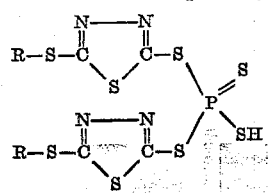

R being a hydrocarbon radical with at least 6 carbon atoms, and metal salts of said thiadiazole derivative.

2. Lubricating additive composition comprising from 30 to 85 percent of a mineral lubricating oil and from 70 to 15 percent of an oil-soluble compound selected from the group consisting of a 2.5-dimercapto-1.3.4-thiadiazole derivative corresponding to the formula

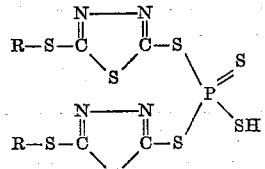

R being a hydrocarbon radical with at least 6 carbon atoms, and metal salts of said thiadiazole derivative.

3. An improved lubricating oil composition comprising a major proportion of a mineral lubricating oil and from about 0.01 to about 5 percent of an oil-soluble compound selected from the group consisting of a 2.5-dimercapto-1.3.4-thiadiazole derivative corresponding to the formula

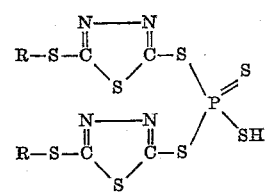

R being a hydrocarbon radical with at least 6 carbon atoms, and metal salts of said thiadiazole derivative.

4. The lubricating oil composition of claim 3 wherein the metal salts are salts of at least one polyvalent metal.

5. An improved lubricating oil comprising a major proportion of a mineral lubricating oil and from about 0.01 to about 5 percent of an oil-soluble, 2.5-dimercapto-1.3.4-thiadiazole derivative corresponding to the formula

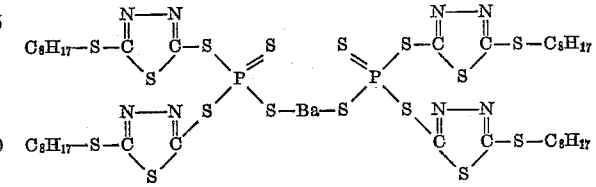

References Cited in the file of this patent

UNITED STATES PATENTS

| | | |
|---|---|---|
| 2,685,587 | Goshorn | Aug. 3, 1954 |
| 2,690,999 | Lowe | Oct. 5, 1954 |
| 2,703,785 | Roberts | Mar. 8, 1955 |
| 2,719,125 | Roberts | Sept. 27, 1955 |
| 2,760,933 | Fields et al. | Aug. 28, 1956 |
| 2,764,547 | Fields | Sept. 25, 1956 |

OTHER REFERENCES

Ziegler: Article in "Monatshefte für Chemie," vol. 81, pp. 848 and 849, 1950.